United States Patent Office 3,752,761
Patented Aug. 14, 1973

3,752,761
BOILER WATER TREATMENT
Jerry Emile Boothe, Pittsburgh, Andrew Jackson Sharpe, Jr., McMurray, and Jerry Lee Walker and Thomas Edward Cornelius III, Coraopolis, Pa., assignors to Calgon Corporation, Pittsburgh, Pa.
No Drawing. Filed Mar. 9, 1972, Ser. No. 233,314
Int. Cl. C02b 5/06
U.S. Cl. 210—58                                              7 Claims

ABSTRACT OF THE DISCLOSURE

It is disclosed that polymers containing at least 1 percent by weight of (3-acrylamido-3-methyl) butyl trimethyl ammonium chloride and/or related monomers perform as excellent boiler water dispersives and conditioners. The polymer should have an average molecular weight of at least 10,000.

BACKGROUND OF THE INVENTION

Certain types of water-soluble polymers have been used in the past to fluidize precipitates, silt, or other solids which may be found in high temperature boiler water systems. For example, in Baum et al. U.S. Pat. 3,630,937, certain water-soluble sulfonated polystyrenes are used by themselves and/or in combination with other boiler chemicals. Certain polyacrylic compounds are used as "sludge conditioners" in boilers by Crum et al. in U.S. Pat. 2,783,200.

In Salutsky U.S. Pat. 3,514,376, short chain polyacrylic acids (molecular weight: 5,000 to 13,000) are used to prevent scale formation in boilers. Ralston, in U.S. application Ser. No. 75,706, uses combinations of certain phosphonates with relatively short chain acrylic acid/acrylamide polymers. Methacrylic acid polymers are used in U.S. Pat. 3,444,054. Short-chain hydrolyzed polyacrylamides are suggested by Booth et al. to prevent scale in distillation processes in U.S. Pat. 3,463,730.

In Ruehrwein U.S. Pat. 2,980,610, polyacrylamides are used for the purpose of inhibiting the precipitation of calcium and other salts in boiler waters. Sulfonated methylol polyacrylamides have also been used, as have hydrolyzed polyacrylamides.

Similar but modified polymers are proposed in U.S. Pats. 3,285,886 and 3,331,773. See also U.S. Pats. 3,518,204 and 3,492,240.

Other water-soluble polymers which have been used for boiler water treatment include naturally-occurring short-length compounds such as tannins and lignins, tannery waste (U.S. Pat. 3,184,407), alginates, and the like.

Cationic polymers have not found any significant use in boilers.

The composition of the solids, precipitates, and silt-like materials which may be found normally in boilers is well known in the art, and will vary with the type of pre-treatment used, such as deionization, lime-soda softening, etc. The solids include silicates, phosphates, iron oxide, and various other components introduced as suspended matter in the boiler feed water or as alkaline earth metal precipitates. Such solids tend to form incrustations or settle in particular areas of the boiler, causing localization of heat-transfer problems. If left untreated, steam purity will decrease, boiler efficiency will be reduced, and short boiler life may be expected.

SUMMARY OF THE INVENTION

It has been discovered that boiler sludge can be fluidized by water-soluble polymers containing at least 1 percent by weight of a monomer of the formula

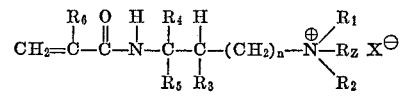

in which $R_1$ and $R_2$ are independently selected from linear and branched alkyl groups having up to 18 carbon atoms, aralkyl groups having up to 10 carbon atoms, and in which $R_1$ and $R_2$ may be combined to form a heterocyclic group having one or more hetero atoms; $R_3$ is selected from the group of hydrogen, lower alkyl groups of 1 to 4 carbon atoms and halogen; $R_4$ is selected from the group of hydrogen, halogen, a linear or branched alkyl group of up to 5 carbon atoms; $R_5$ is phenyl, lower alkyl (1 to 4 carbon atoms), substituted phenyl wherein the substituents may be lower alkyl (1 to 4 carbon atoms), or lower alkoxy (1 to 4 carbon atoms); $R_3$ or $R_4$ can combine with $R_5$ to form a cyclic group of at least 6 carbon atoms or a bicyclic group of at least 7 carbon atoms, which groups can be substituted with a linear or branched alkyl group having up to 5 carbon atoms; $R_6$ is selected from hydrogen and methyl; $R_Z$ may be any group capable of quaternizing the nitrogen, including the group consisting of hydrogen, benzyl, phenethyl, cyanoethyl, and linear, branched and substituted alkyl and aralkyl groups having 1 to 16 carbon atoms, the substitutions therefor being halide, —OH, —COO$^\ominus$, and —SO$_3^\ominus$, where the counter ion for the anionic substitution is normally hydrogen or alkali metal; $X^\ominus$ may be any anion, preferably halide, alkosulfate, tosylate, carboxylate, sulfonate, sulfate, phosphate, acetate, or nitrate; and $n$ is an integer from 0 to 2. Where the substitution is anionic, the preferred associated cation is hydrogen or alkali metal.

We may also use the amine form of the above formula, i.e., where $R_Z$ and $X^\ominus$ are not present.

We may use either homopolymers of the above cationic monomers or copolymers thereof with water-soluble monomers or even water-insoluble monomers so long as the polymer is water-soluble to the extent of at least 1 p.p.m. Preferred polymers are those including at least 1 percent, by weight, (3-acrylamido-3-methyl) butyl trimethyl ammonium chloride, and in particular, a homopolymer thereof and copolymers with acrylamide.

Water-soluble comonomers which are useful include acrylamide, acrylic acid and dimethyl diallyl ammonium chloride. Useful water-insoluble monomers include styrene, methyl methacrylate, methylacrylate, acrylonitrile, butadiene. Preferred copolymers contain at least 1 percent monomers derived from the above formula and the balance selected from acrylamide and acrylic acid. The acrylamide portion may be hydrolyzed to the acid form up to 70 percent, or about that.

The polymers should have a molecular weight of at least 2,000. There is no known maximum molecular weight so long as the polymer is water-soluble. However, molecular weights over 100,000 may be superfluous.

Although we are aware of no minimum concentration in the boiler below which the herein-described polymers are absolutely ineffective, for practical purposes, the polymer should be present in the boiler water in concentrations no less than 0.1 p.p.m. Above 30 p.p.m. there is no discernible improvement, but higher concentrations are not harmful; we recommend no greater than 50 p.p.m.

To demonstrate the utility of our process, a settling test was used which is known to be correlated to boiler treatment efficiency. This test employs a synthetic $Ca_3(PO_4)_2$ sludge dispersed in water, and the boiler treatment efficiency is compared to the settling rates of the flocs formed. Results were as in Table 1.

TABLE 1

| Treating agent: | Settling rate, seconds |
|---|---|
| Control (no treatment) | 275 |
| AMBTAC [1] | 170 |
| AM/AMBTAC [2] | 95 |

[1] (3-acrylamido-3-methyl) butyl trimethyl ammonium chloride homopolymer having a Brookfield viscosity of 350 cps. (spindle #2LV, 0.25 percent aqueous solution, 6 r.p.m.).
[2] Copolymer of 40 percent acrylamide (not hydrolyzed) and 60 percent AMBTAC having a Brookfield viscosity of 625 cps. (spindle #2LV, 0.25 percent aqueous solution, 6 r.p.m.).

The polymers including monomers of the formula or the amine form thereof are compatible with common boiler additives such as phosphates, lignins or other dispersives, antifoams, and chelating agents like ethylene diamine tetraacetic acid and nitrilotriacetic acid and their salts.

We do not intend to be restricted to the particular examples and illustrations herein. Our invention may be otherwise variously practiced within the scope of the following claims.

We claim:

1. Method of treating solids in boiler water comprising adding to said boiler water a small amount of a water-soluble polymer containing at least about 1 percent by weight monomer of the structural formula

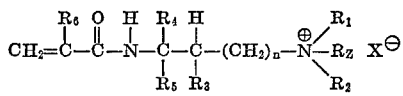

in which $R_1$ and $R_2$ are independently selected from linear and branched alkyl groups having up to 18 carbon atoms, aralkyl groups having up to 10 carbon atoms, and in which $R_1$ and $R_2$ may be combined to form a heterocyclic group having one or more hetero atoms; $R_3$ is selected from the group of hydrogen, lower alkyl groups of 1 to 4 carbon atoms and halogen; $R_4$ is selected from the group of hydrogen, halogen, a linear or branched alkyl group of up to 5 carbon atoms; $R_5$ is phenyl, lower alkyl (1 to 4 carbon atoms), substituted phenyl wherein the substituents may be lower alkyl (1 to 4 carbon atoms), or lower alkoxy (1 to 4 carbon atoms); $R_3$ or $R_4$ can combine with $R_5$ to form a cyclic group of at least 6 carbon atoms or a bicyclic group of at least 7 carbon atoms, which groups can be substituted with a linear or branched alkyl group having up to 5 carbon atoms; $R_6$ is selected from hydrogen and methyl; $R_Z$ may be any group capable of quaternizing the nitrogen, including the group consisting of hydrogen, benzyl, phenethyl, cyanoethyl, and linear, branched and substituted alkyl and aralkyl groups having 1 to 16 carbon atoms, the substitutions therefor being halide, —OH, —COO$^\ominus$, and —SO$_3^\ominus$, where the counter ion for the anionic substitution is normally hydrogen or alkali metal; $X^\ominus$ may be any anion, preferably halide, alkosulfate, tosylate, carboxylate, sulfonate, sulfate, phosphate, acetate, or nitrate; and $n$ is an integer from 0 to 2.

2. Method of claim 1 in which the polymer is a homopolymer.

3. Method of claim 1 in which the polymer is a copolymer comprising (a) at least 1 percent by weight (3-acrylamido-3-methyl) butyl trimethyl ammonium chloride and (b) the group consisting of acrylamide, acrylic acid, and hydrolyzed acrylamide mer units.

4. Method of claim 1 in which the polymer is added to the boiler in quantities of about 0.1 p.p.m. to about 50 p.p.m.

5. Method of claim 2 in which the homopolymer is of (3-acrylamido-3-methyl)butyl trimethyl ammonium chloride.

6. Method of treating solids in boiler water comprising adding to said boiler water a small amount of a water-soluble polymer containing at least about 1 percent by weight monomer of the structural formula

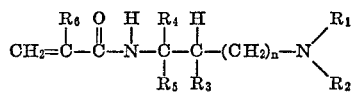

in which $R_1$ and $R_2$ are independently selected from linear and branched alkyl groups having up to 18 carbon atoms, aralkyl groups having up to 10 carbon atoms, and in which $R_1$ and $R_2$ may be combined to form a heterocyclic group having one or more hetero atoms; $R_3$ is selected from the group of hydrogen, lower alkyl groups of 1 to 4 carbon atoms and halogen; $R_4$ is selected from the group of hydrogen, halogen, a linear or branched alkyl group of up to 5 carbon atoms; $R_5$ is phenyl, lower alkyl (1 to 4 carbon atoms), substituted phenyl wherein the substituents may be lower alkyl (1 to 4 carbon atoms), or lower alkoxy (1 to 4 carbon atoms); $R_3$ or $R_4$ can combine with $R_5$ to form a cyclic group of at least 6 carbon atoms or a bicyclic group of at least 7 carbon atoms, which groups can be substituted with a linear or branched alkyl group having up to 5 carbon atoms; $R_6$ is selected from hydrogen and methyl; and $n$ is an integer from 0 to 2.

7. Method of claim 6 in which the polymer is a homopolymer of (3-acrylamido-3-methyl) butyl dimethyl amine.

References Cited
UNITED STATES PATENTS

| 3,472,767 | 10/1969 | Lees | 210—54 X |
| 3,579,445 | 5/1971 | Tate | 210—58 |
| 3,692,673 | 9/1972 | Hoke | 210—52 |

MICHAEL ROGERS, Primary Examiner

U.S. Cl. X.R.
210—54; 252—180